(12) United States Patent
Tsuneyoshi et al.

(10) Patent No.: US 12,077,937 B2
(45) Date of Patent: Sep. 3, 2024

(54) FRAME OF CONSTRUCTION MACHINE

(71) Applicant: Caterpillar SARL, Geneva (CH)

(72) Inventors: Takeshi Tsuneyoshi, Akashi (JP); Masato Tamura, Akashi (JP)

(73) Assignee: Caterpillar SARL, Geneva (CH)

( * ) Notice: Subject to any disclaimer, the term of this patent is extended or adjusted under 35 U.S.C. 154(b) by 332 days.

(21) Appl. No.: 17/613,797

(22) PCT Filed: May 21, 2020

(86) PCT No.: PCT/EP2020/025236
§ 371 (c)(1),
(2) Date: Nov. 23, 2021

(87) PCT Pub. No.: WO2020/239256
PCT Pub. Date: Dec. 3, 2020

(65) Prior Publication Data
US 2022/0228344 A1    Jul. 21, 2022

(30) Foreign Application Priority Data
May 24, 2019    (JP) .................................. 2019-097266

(51) Int. Cl.
*E02F 9/08* (2006.01)
*B62D 21/18* (2006.01)
*B62D 21/10* (2006.01)

(52) U.S. Cl.
CPC .......... *E02F 9/0816* (2013.01); *B62D 21/186* (2013.01); *B62D 21/10* (2013.01); *E02F 9/08* (2013.01); *E02F 9/0808* (2013.01)

(58) Field of Classification Search
CPC ......... E02F 9/0816; E02F 9/08; E02F 9/0808; B62D 21/186; B62D 21/10
(Continued)

(56) References Cited

U.S. PATENT DOCUMENTS 9,388,552 B2 * 7/2016 Okunishi .................. F16L 3/01

FOREIGN PATENT DOCUMENTS

| CA | 3030496 A1 * | 7/2019 | ............... E02F 3/48 |
| CN | 102966136 | 3/2013 | |

(Continued)

OTHER PUBLICATIONS

Chinese Patent Office Second Office Action for China Patent Appln. No. 202080036915.1, mailed Aug. 31, 2023 (6 pgs).
(Continued)

*Primary Examiner* — Amy R Weisberg
*Assistant Examiner* — Dana D Ivey

(57) ABSTRACT

To provide a frame of construction machines that can enhance the rigidity of support members. The frame comprises a bottom plate, a pair of vertical plates being disposed spacedly in a width direction on a top surface of the bottom plate and extending longitudinally and vertically, and multiple support members extending toward outside in a width direction from breadthwise outer surface of the pair of vertical plates. At least one of the multiple support members comprises a vertical wall perpendicular to the bottom plate. A breadthwise inner end part of vertical wall is welded on breadthwise outer surface of one of pair of vertical plates. A lower end of the pair of vertical plates is welded intermittently on a top surface of the bottom plate, and there exists a non-welded part where the lower end of the vertical plates is not welded on the top surface of the bottom plate under breadthwise inner end part of the vertical wall.

5 Claims, 7 Drawing Sheets

(58) Field of Classification Search
USPC .................................................. 296/193.01
See application file for complete search history.

(56) References Cited

FOREIGN PATENT DOCUMENTS

| | | | | | |
|---|---|---|---|---|---|
| CN | 104768691 | | 7/2015 | | |
| CN | 104768691 A | * | 7/2015 | ............ | B23K 31/02 |
| JP | 2001049695 A | * | 2/2001 | | |
| JP | 2004308247 A | * | 11/2004 | | |
| JP | 3712142 B2 | * | 11/2005 | | |
| JP | 2014-105499 A | | 6/2014 | | |
| JP | 2016030953 A | * | 3/2016 | | |
| KR | 20080093582 A | | 10/2008 | | |
| WO | 2009157238 A1 | | 12/2009 | | |
| WO | WO-2014174042 A1 | * | 10/2014 | ............ | E02F 9/0816 |

OTHER PUBLICATIONS

Chinese Patent Office First Office Action for Chinese Patent Appln. No. 202080036915.1, mailed Jan. 20, 2023 (6 pgs).
International Search Report related to Application No. PCT/EP2020/025236; reported on Aug. 28, 2020.

* cited by examiner

FRAME OF CONSTRUCTION MACHINE

CROSS-REFERENCE TO RELATED APPLICATION

This Application is a 35 USC § 371 US National Stage filing of International Application No. PCT/EP2020/025236 filed on May 21, 2020 which claims priority under the Paris Convention to Japanese Patent Application No. 2019-097266 filed on May 24, 2019.

FIELD OF THE INVENTION

This disclosure relates to a frame used in construction machines including hydraulic shovels.

BACKGROUND ART

In general, a hydraulic shovel as a typical example of construction machines comprises a lower traveling body, an upper swiveling body swivelably mounted on to the lower traveling body, and a working arm device operably installed on the upper swiveling body. A frame of upper swiveling body comprises a bottom plate, a pair of vertical plates being disposed spacedly in a width direction on a top surface of the bottom plate and extending longitudinally and vertically, and multiple support members extending toward outside in a width direction from breadthwise outer surface of the pair of vertical plates. A cab and various components (fuel tank, hydraulic tank, and others, for example) are mounted on the multiple support members.

When the frame of upper swiveling body is produced, a lower end of a pair of vertical plates is welded on a top surface of the bottom plate, then an upper end position of support members is adjusted with reference to the top or lower surface of the bottom plate, and a breadthwise inner end part of support members is welded on the breadthwise outer surface of the vertical plates. In this case, in order to adjust upper end position of support members, the lower end of support members may not be welded on the top surface of the bottom plate (refer to PTL 1, for example).

CITATION LIST

Patent Document

PTL 1: Japanese Unexamined Patent Application Publication No. 2014-105499

SUMMARY OF INVENTION

Problem to be Solved by the Invention

As for the frame of upper swiveling body, since it is required to avoid interfering of the lower end of support members with the welded part between top surface of the bottom plate and lower end of the vertical plates, the lower end position of support members is restricted. Also, as for the frame of upper swiveling body, the upper end position of components is restricted in order to avoid visibility degradation of an operator in the cab, in addition, the components have become larger nowadays, and dimensions of construction machines are restricted during transportation, so the upper end position of support members is also restricted. Therefore, since vertical dimensions of the welded part between support members and vertical plates are restricted as a result that vertical dimensions of support members are restricted, if a lower end of support members is not welded on the top surface of the bottom plate similar to the frame described in PTL 1 above, there arises a problem that it is difficult to secure a rigidity of the support members.

In consideration of what mentioned above, a task of the present invention is to provide a frame of construction machines that can enhance the rigidity of support members.

Means for Solving the Problem

In order to solve the task above, this invention provides following frame of construction machines. That is to say, this invention provides the frame of construction machines that comprises a bottom plate, a pair of vertical plates being disposed spacedly in a width direction on a top surface of said bottom plate and extending longitudinally and vertically, and multiple support members extending toward outside in a width direction from breadthwise outer surface of said pair of vertical plates, wherein at least one of said multiple support members comprises a vertical wall perpendicular to said bottom plate, a breadthwise inner end part of said vertical wall is welded on one breadthwise outer surface of said pair of vertical plates, a lower end of said pair of vertical plates is welded intermittently on the top surface of said bottom plate, and there exists a non-welded part where the lower end of said vertical plates is not welded on the top surface of said bottom plate under breadthwise inner end part of said vertical wall.

A notch is preferably formed at a breadthwise inner portion of said vertical wall. It may be suitable that an annular swiveling bearing is connected to a lower surface of said bottom plate and said non-welded part is located at other than a portion intersecting said pair of vertical plates and said swiveling bearing as seen from vertical direction. It may be convenient that a recess is formed on a top surface of said bottom plate in said non-welded part. A through opening may be formed at said bottom plate in said non-welded part.

Favorable Effects of the Invention

Since there exists non-welded part in the frame of this invention where the lower end of vertical plates is not welded on a top surface of bottom plate under breadthwise inner end part of vertical wall, a lower end of the vertical wall may not interfere with the welded part between top surface of the bottom plate and lower end of vertical plates, vertical dimensions of the vertical wall may be increased by extending lower end position of the vertical wall downward, and in addition, length of welded part can be increased between breadthwise inner end part of vertical wall and breadthwise outer surface of vertical plates. Thus, the rigidity of support members can be enhanced according to the frame of this invention.

DETAILED DESCRIPTION OF THE INVENTION

Now, an explanation is provided for a suitable embodiment of the frame of construction machines configured according to this invention by giving a frame (swiveling frame) used for upper swiveling body of hydraulic shovel as an example and by referring to drawings.

Figure 1:
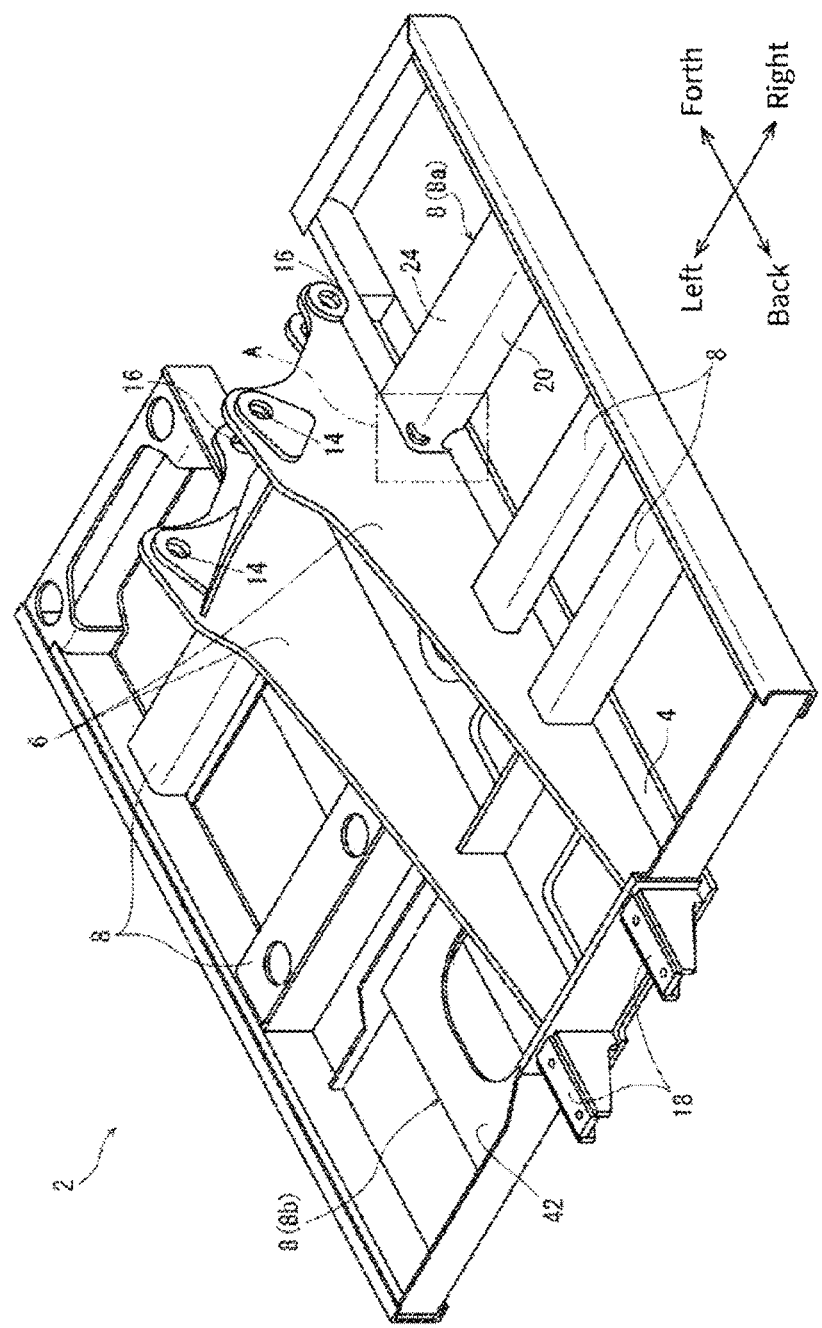
FIG. 1 is a perspective view seen from the back of the frame configured according to this invention.
Figure 2:
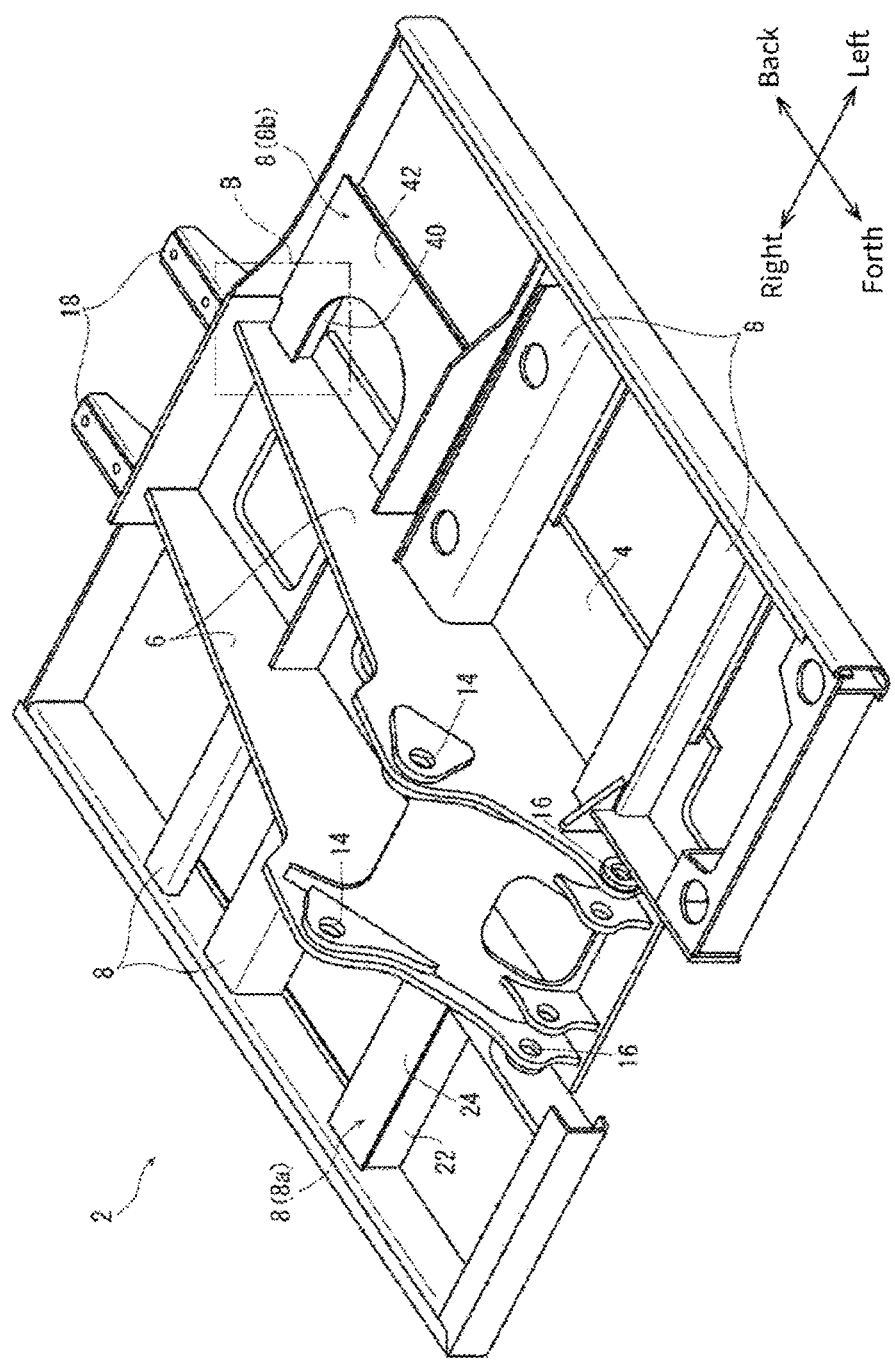
FIG. 2 is a perspective view seen from the front of the frame shown in FIG. 1.

As shown in FIGS. 1 and 2, a frame, the whole of which is indicated by symbol 2, is formed of appropriate metallic material such as steel material and comprises a bottom plate 4, a pair of vertical plates 6 being disposed spacedly in a width direction on a top surface of the bottom plate 4 and extending longitudinally and vertically, and multiple support members 8 extending toward outside in a width direction from breadthwise outer surface of the pair of vertical plates 6. In addition, note that the longitudinal and breadthwise (horizontal) directions are shown with back, forth, right, and left letters and arrows respectively in FIGS. 1, 2.

Figure 3:
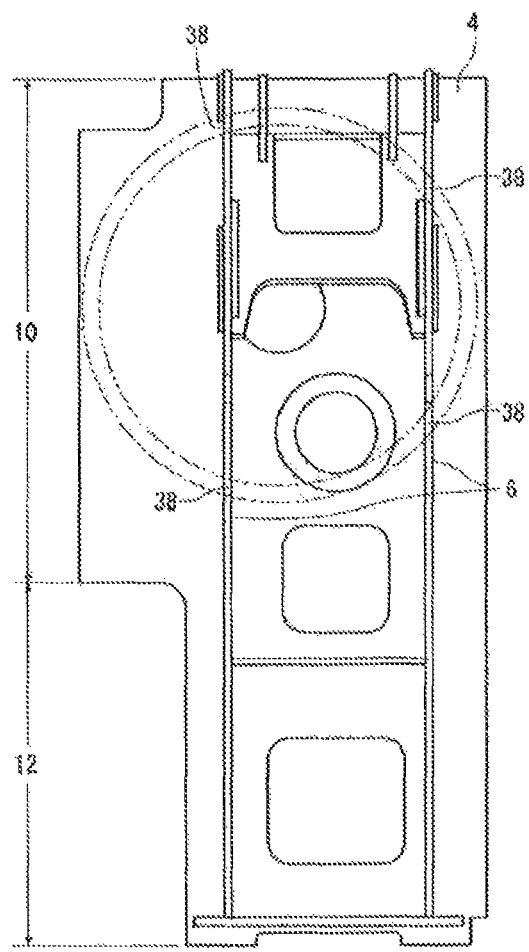
FIG. 3 is a plane view of the frame shown in FIG. 1 where support members and others are removed.

As shown in FIG. 3, the bottom plate 4 extends longitudinally and breadthwise and has a relatively wide anterior part 10 and a back part 12 narrower in width than the anterior part 10. An annular swiveling bearing (not shown) is connected to a lower surface of anterior part 10 and frame 2 is swivelably mounted on to a frame (not shown) of lower traveling body via swiveling bearing. Chain double-dashed lines in FIG. 3 illustrate a portion where the swiveling bearing is connected to the lower surface of anterior part 10.

Referring to FIGS. 1 and 2 for illustration, a pinhole 14 for boom connection is formed at a top part of triangular vertical plates 6 for operably connecting base end part of a boom of working arm device (not shown) with a pin. A pinhole 16 for boom cylinder connection is formed at a front end part of vertical plates 6 for connecting base end part of a boom cylinder (not shown) with a pin which actuates the boom. A pair of counter weight attaching parts 18 are provided on a rear side of vertical plates 6 for attaching the counter weight (not shown) in order to balance with the working arm device. The bottom plate 4 and vertical plates 6 are structural members on which a large load may act from the working arm device and counter weight and are formed out of relatively thick plate materials. Also, the lower end of each vertical plate 6 is intermittently welded on the top surface of bottom plate 4 from breadthwise inside and outside. Non-welded part of the lower end of vertical plates 6 not welded on the top surface of bottom plate 4 will be described later.

The cab and various components (neither is shown) are mounted on the support members 8, and the support members 8 are formed in various shapes according to members to be mounted. This specification describes in detail the support members 8a on a right front side and support members 8b on a left rear side.

Figure 4:
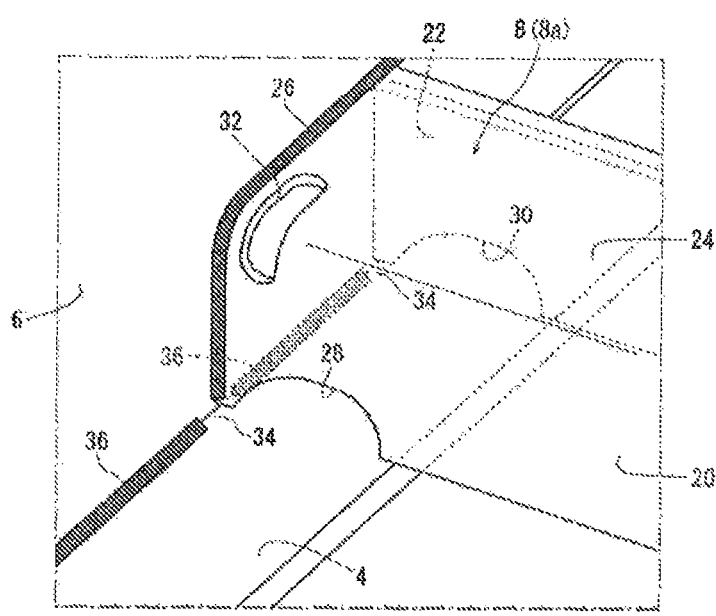
FIG. 4 is an enlarged perspective view at section A in FIG. 1.

Referring to FIGS. 1, 2, and 4 for illustration, an explanation is provided about support member 8a on a right front side. The support member 8a includes a first vertical wall 20 perpendicular to the bottom plate 4, a second vertical wall 22 perpendicular to the bottom plate 4 and disposed in front of the first vertical wall 20, and a top surface wall 24 extending from upper end of the first vertical wall 20 to upper end of second vertical wall 22. As for the support member 8a shown in illustrated embodiment, although first vertical wall 20 and top surface wall 24 are composed of a plate material bent at a right angle, they may be composed of separate plate materials. Also, first vertical wall 20, second vertical wall 22, and top surface wall 24 may be composed of a plate material.

Each breadthwise inner end part of first vertical wall 20, second vertical wall 22, and top surface wall 24 is welded on breadthwise outer surface of right vertical plate 6. A symbol 26 shown in FIG. 4 indicates a welded part between each of first vertical wall 20 and top surface wall 24 and vertical plates 6. Meanwhile, each lower end of first and second vertical walls 20, 22 is not welded on the top surface of bottom plate 4.

As shown in FIG. 4, an arc notch 28 is formed at a lower end of breadthwise inner portion of first vertical wall 20, and an arc notch 30 is also formed at a lower end of breadthwise inner portion of second vertical wall 22. Also, on the support member 8a, a notch 32, is formed which extends from an upper end side of breadthwise inner portion of first vertical wall 20 to a rear end side of breadthwise inner portion of top surface wall 24. In this manner, since three notches 28, 30, and 32 are formed on the support member 8a in illustrated embodiment, a stress concentration on the welded part 26 is mitigated and a development of crack is prevented on the welded part 26. Also, hydraulic conduit line or wire, and others may be passed through notches 28, 30 on a lower end side of first and second vertical walls 20, 22.

As explained above, while lower end of vertical plates 6 is intermittently welded on the top surface of bottom plate 4, as shown in FIG. 4, under each breadthwise inner end part of first and second vertical walls 20, 22 of the support member 8a, there exists a non-welded part 34 where the top surface of bottom plate 4 is not welded with a lower end of right vertical plate 6. Thus, each lower end of first and second vertical walls 20, 22 may not interfere with welded part 36 on a breadthwise outside between the top surface of bottom plate 4 and the lower end of right vertical plate 6. Therefore, as for the frame 2 in illustrated embodiment, each lower end position of first and second vertical walls 20, 22 may be extended downward so that respective vertical dimensions of the first and second vertical walls 20, 22 can be increased, and in addition, the length of welded part 26 can be increased. Thus, the rigidity of support member 8a can be enhanced according to the frame 2 in illustrated embodiment.

The non-welded part 34 may be preferably located at any position other than crossing portion 38 (refer to FIG. 3) seen vertically between a pair of vertical plates 6 and swiveling bearing. As the frame 2 of upper swiveling body is connected with the frame of lower traveling body via swiveling bearing, relatively high stress occurs at the crossing portion 38. So, from the point of view of securing adequate rigidity and fatigue strength of frame 2, it is suitable that top surface of bottom plate 4 is welded with lower end of vertical plates 6 at the crossing portion 38 and non-welded part 34 is located at other than the crossing portion 38.

Figure 5:
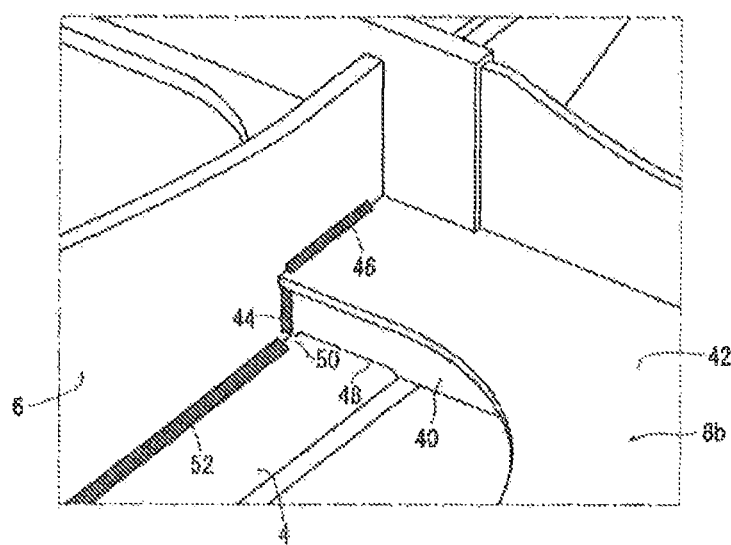
FIG. 5 is an enlarged perspective view at section B in FIG. 2.

Next, referring to FIG. 5 for illustration, an explanation is provided about support member 8b on a left rear side. The support member 8b includes a vertical wall 40 perpendicular to the bottom plate 4 and a top surface wall 42 connected to upper end of vertical wall 40. Each breadthwise inner end part of vertical wall 40 and top surface wall 42 is welded on breadthwise outer surface of left vertical plate 6. A symbol 44 in FIG. 5 indicates the welded part between vertical wall 40 and vertical plate 6 and a symbol 46 in FIG. 5 indicates the welded part between top surface wall 42 and vertical plate 6. Meanwhile, the lower end of vertical wall 40 is not welded on the top surface of bottom plate 4. Also, a notch 48 is formed at a lower end of breadthwise inner portion of vertical wall 40 in order to mitigate stress concentration on the welded parts 44, 46.

As shown in FIG. 5, there exists non-welded part 50 where the top surface of bottom plate 4 is not welded with the lower end of left vertical plate 6 under breadthwise inner end part of vertical wall 40 of the support member 8b. Thus, the lower end of vertical wall 40 may not interfere with welded part 52 on a breadthwise outside between the top surface of bottom plate 4 and the lower end of left vertical plate 6. Therefore, as for the frame 2 in illustrated embodiment, the lower end position of vertical wall 40 may be extended downward so that vertical dimensions of the vertical wall 40 can be increased, and in addition, the length of welded part 44 can be increased. Thus, the rigidity of support member 8b can be enhanced according to the frame 2 in illustrated embodiment.

Figure 6:
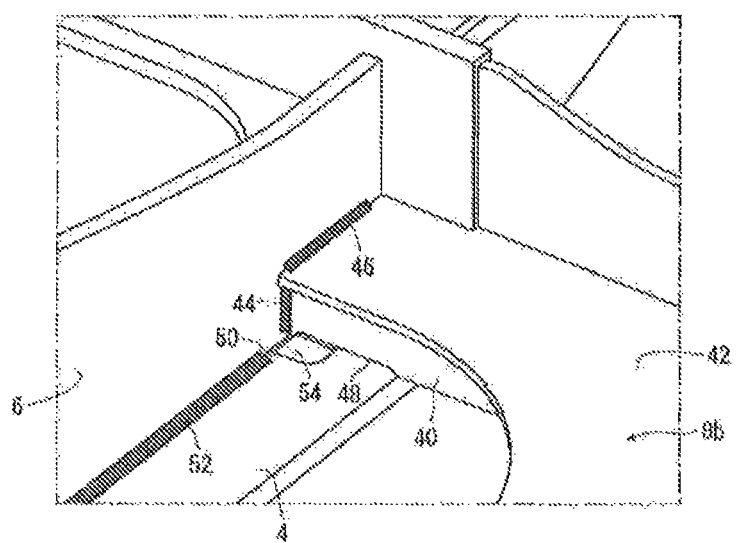
FIG. 6 is a perspective view equivalent to FIG. 5 when a recess is formed on the bottom plate.
Figure 7:
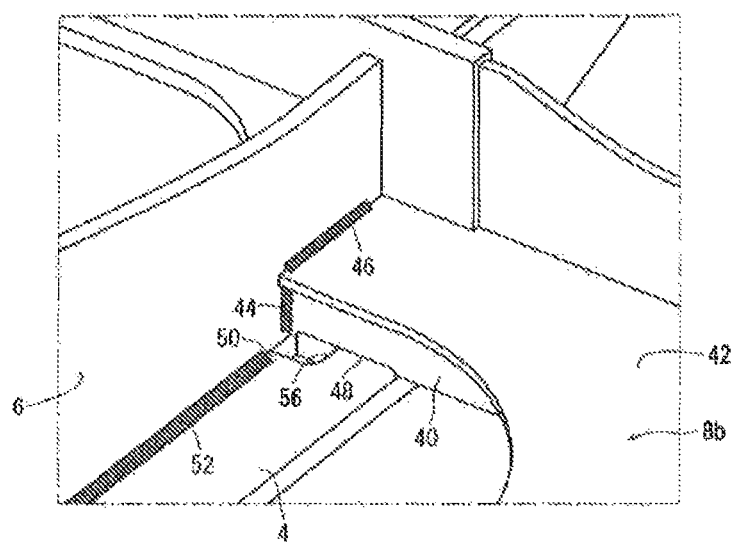
FIG. 7 is a perspective view equivalent to FIG. 5 when a through opening is formed on the bottom plate.

As shown in FIG. 6, a recess 54 may be formed on top surface of bottom plate 4 in non-welded part 50. Alternatively, as shown in FIG. 7, a through opening 56 may be formed at bottom plate 4 in non-welded part 50. Since the recess 54 or through opening 56 is formed on the bottom plate 4, the lower end position of vertical wall 40 may be extended downward so that vertical dimensions of the vertical wall 40 and the length of welded part 44 can be further increased.

In addition, in the frame 2 in illustrated embodiment, an example was provided where there existed non-welded parts 34, 50 under each of both first and second vertical walls 20, 22 of support member 8a on a right front side and vertical wall 40 of support member 8b on a left rear side, but the non-welded part just needs to exist under at least one vertical wall of multiple support members 8 and the non-welded part is not limited to the position under vertical wall of specific support member 8.

Three notches 28, 30, and 32 are formed on the support member 8a on a right front side in illustrated embodiment, but the number of notches is optional, and the notch may not have to be formed. As for vertical wall 40 of support member 8b on a left rear side, the number of notches is optional, and the notch may not have to be formed.

In the frame 2 in illustrated embodiment, an explanation was also provided that a recess 54 or through opening 56 was formed on the bottom plate 4 located under vertical wall 40 of support member 8b on a left rear side, but the recess or through opening may be formed on the bottom plate 4 located under first or second vertical wall 20 or 22 of support member 8a on a right front side.

In case when non-welded parts 34, 50 are located at the crossing portion 38 and when a through opening is formed on the bottom plate 4, rainwater and others may enter into swiveling bearing, so a recess may be formed on a top surface of bottom plate 4. Also, regardless of whether non-welded parts 34, 50 are located under crossing portion 38, when a recess is formed on the top surface of bottom plate 4 in the non-welded parts 34, 50, rainwater and others accumulated in the recess may cause rust, so in order to drain the rainwater and others away from the recess, a hole may be formed extending downward from a bottom of the recess, or a groove extending from the recess to an end part of bottom plate 4 may be formed on the top surface of bottom plate 4.

A shape of the recess or through opening in non-welded parts 34, 50 is not limited to those shapes which are located only just under non-welded parts 34, 50. At least a part of the recess and through opening only needs to be located just under non-welded parts 34, 50. The shape of the recess or through opening in non-welded parts 34, 50 may be, for example, a groove or long hole extending just under non-welded parts 34, 50 to the end part of bottom plate 4.

The invention claimed is:

1. A frame of a construction machine comprising: a bottom plate, a pair of vertical plates being disposed spacedly in a width direction on a top surface of said bottom plate and extending longitudinally and vertically, and multiple support members extending toward an outside in a width direction from a breadthwise outer surface of said pair of vertical plates,
   wherein at least one of said multiple support members comprises a vertical wall perpendicular to said bottom plate, a breadthwise inner end part of said vertical wall is welded on one breadthwise outer surface of said pair of vertical plates,
   wherein a lower end of said pair of vertical plates is welded intermittently on a top surface of said bottom plate, and there exists a non-welded part where the lower end of said vertical plates is not welded on the top surface of said bottom plate under breadthwise inner end part of said vertical wall.

2. The frame of the construction machine of claim 1, wherein a notch is formed at a breadthwise inner portion of said vertical wall.

3. The frame of the construction machine of claim 1, wherein an annular swiveling bearing is connected to a lower surface of said bottom plate and said non-welded part is located at other than a portion intersecting said pair of vertical plates and said swiveling bearing as seen from vertical direction.

4. The frame of the construction machine of claim 1, wherein a recess is formed on the top surface of said bottom plate in said non-welded part.

5. The frame of the construction machine of claim 1, wherein a through opening is formed at said bottom plate in said non-welded part.

* * * * *